United States Patent
Kakuma et al.

(10) Patent No.: US 8,462,484 B2
(45) Date of Patent: Jun. 11, 2013

(54) METHOD FOR MANUFACTURING ELECTROLYTIC CAPACITOR WITH ELECTRICALLY CONDUCTIVE SOLID LAYER AND ELECTROLYTIC CAPACITOR WITH ELECTRICALLY CONDUCTIVE SOLID LAYER

(75) Inventors: Kenji Kakuma, Shimane (JP); Masakazu Hosogi, Shimane (JP); Junichi Yamashita, Hyogo (JP); Yutaka Taketani, Osaka (JP); Hiroyuki Okuda, Osaka (JP); Koso Ishihara, Mie (JP)

(73) Assignees: SANYO Electric Co., Ltd., Moriguchi-shi (JP); Sun Electronic Industries Corp., Shijyonawate-shi (JP)

( * ) Notice: Subject to any disclaimer, the term of this patent is extended or adjusted under 35 U.S.C. 154(b) by 741 days.

(21) Appl. No.: 12/260,596

(22) Filed: Oct. 29, 2008

(65) Prior Publication Data

US 2009/0109602 A1  Apr. 30, 2009

(30) Foreign Application Priority Data

Oct. 30, 2007 (JP) ................................. 2007-282195

(51) Int. Cl.
*H01G 9/02* (2006.01)
*H01G 9/00* (2006.01)
*H01G 9/15* (2006.01)
*H01G 11/56* (2006.01)

(52) U.S. Cl.
CPC . *H01G 9/15* (2013.01); *H01G 11/56* (2013.01)
USPC ......................................... 361/525; 29/25.03

(58) Field of Classification Search
USPC .............................. 361/525, 274.2; 29/25.03
See application file for complete search history.

(56) References Cited

U.S. PATENT DOCUMENTS

| 1,992,545 | A | * | 2/1935 | Robinson ....................... 361/526 |
| 2,628,265 | A | * | 2/1953 | Busse et al. .................... 361/327 |
| 4,910,645 | A |   | 3/1990 | Jonas et al. |
| 6,375,688 | B1 | * | 4/2002 | Akami et al. ................. 29/25.03 |
| 6,454,817 | B1 | * | 9/2002 | Shin et al. ..................... 29/25.03 |
| 7,227,738 | B2 | * | 6/2007 | Takeda et al. .................. 361/503 |

(Continued)

FOREIGN PATENT DOCUMENTS

| JP | 01114029 A | * | 5/1989 |
| JP | 2-263425 A |   | 10/1990 |

(Continued)

OTHER PUBLICATIONS

Chinese Office Action dated May 12, 2011, issued in corresponding Chinese Patent Application No. 200810149971.7.

(Continued)

*Primary Examiner* — David M Sinclair
(74) *Attorney, Agent, or Firm* — Westerman, Hattori, Daniels & Adrian, LLP

(57) ABSTRACT

A method for manufacturing an electrolytic capacitor including: forming a capacitor element having an anode foil and a cathode foil; impregnating the capacitor element with a dispersion solution containing particles of an electrically conductive solid or aggregates thereof and a dispersion solvent to form an electrically conductive solid layer having the particles of the electrically conductive solid or the aggregates thereof in the capacitor element ; and impregnating the capacitor element having the electrically conductive solid layer with a solvent containing no supporting salt.

20 Claims, 5 Drawing Sheets

U.S. PATENT DOCUMENTS

| | | | |
|---|---|---|---|
| 7,563,290 B2 * | 7/2009 | Qiu et al. | 29/25.03 |
| 7,621,970 B2 * | 11/2009 | Furusawa et al. | 29/25.03 |
| 2006/0047030 A1 | 3/2006 | Yoshida et al. | |
| 2006/0236631 A1 | 10/2006 | Moriau et al. | |
| 2007/0171597 A1 | 7/2007 | Merker et al. | |
| 2008/0002334 A1 | 1/2008 | Kakuma et al. | |

FOREIGN PATENT DOCUMENTS

| | | |
|---|---|---|
| JP | 11-186110 A | 7/1999 |
| JP | 11-219863 A | 8/1999 |
| JP | 3040113 B2 | 5/2000 |
| JP | 2003-100559 A | 4/2003 |
| JP | 2003-100561 A | 4/2003 |
| JP | 2006-100774 A | 4/2006 |
| JP | 2006-236829 A | 9/2006 |
| JP | 2006-295184 A | 10/2006 |
| JP | 2008-10657 A | 1/2008 |
| TW | 200620328 A | 6/2006 |
| TW | 200721217 A | 6/2007 |

OTHER PUBLICATIONS

Explanation of Relevance for cited Foreign Patent Documents.

Japanese Office Action dated Oct. 18, 2011, issued in corresponding Patent Application No. 2003-100561.

Taiwanese Office Action dated Oct. 8, 2012, issued in corresponding Taiwanese patent application No. 097130493.

* cited by examiner

PRIOR ART

METHOD FOR MANUFACTURING ELECTROLYTIC CAPACITOR WITH ELECTRICALLY CONDUCTIVE SOLID LAYER AND ELECTROLYTIC CAPACITOR WITH ELECTRICALLY CONDUCTIVE SOLID LAYER

RELATED CASE

The present application is related to the U.S. patent application Ser. No. 12/168,489, entitled "METHOD FOR MANUFACTURING ELECTROLYTIC CAPACITOR AND ELECTROLYTIC CAPACITOR," filed Jul. 7, 2008, which is commonly assigned to the same assignees of the present application and which claims a priority based on Japanese Patent Application No. 2007-180383 filed Jul. 9, 2007, all of which are hereby incorporated by reference in their entirely.

BACKGROUND OF THE INVENTION

1. Field of the Invention

The invention relates to an electrolytic capacitor including an electrically conductive solid layer formed in a capacitor element having an anode foil and a cathode foil.

2. Description of the Related Art

As digitization of electronic equipment proceeds, it has become required that capacitors used therefor have a smaller size, a larger capacitance and a lower Equivalent Series Resistance (hereinafter, referred to as "ESR") in a high-frequency range.

In order to reduce the ESR in a high frequency range, a solid electrolytic capacitor using, an electrically conductive material such as an electrically conductive polymer containing polypyrrole, polythiophene, and derivatives thereof as an electrolyte with higher electric conductivity than that of a conventional driving electrolytic solution has been known (see, for example, Japanese Examined Patent Publication No. 3040113).

Further, in terms of an increase in the capacitance, a solid electrolytic capacitor having an electrically conductive solid layer containing the above-described electrically conductive solid polymer which is formed in a wound capacitor element or a laminated capacitor element, has been commercialized. The wound capacitor element has a configuration in which an anode foil and a cathode foil are wound with a separator interposed therebetween and the laminated capacitor element has a configuration in which a plurality of anode foils and cathode foils are laminated.

However, with respect to the solid electrolytic capacitor described above, since an electrically conductive solid polymer having low repairability of a dielectric layer as an electrolyte is employed, the leak current tends to increase. Namely, in a case of an electrolytic capacitor filled with an electrolytic solution, since the electrolytic solution is brought into contact with a damaged portion of a dielectric layer, the damaged portion can be repaired by oxidation reaction with oxygen generated from a supporting salt of an ionic compound in the electrolytic solution when a rated voltage is applied. On the other hand, in a case of a solid electrolytic capacitor in which an electrically conductive solid layer is formed, since essentially no ionic migration occurs, the repair action as described above can scarcely be expected.

From the above-described point of view, a solid electrolytic capacitor, in which a capacitor element includes both of an electrically conductive solid layer containing an electrically conductive solid polymer and an electrolytic solution containing a supporting salt, has been proposed (see, for example, Japanese Unexamined Patent Publication No. 2006-100774).

The above-described solid electrolytic capacitor having both of a electrically conductive solid layer containing an electrically conductive polymer and an electrolytic solution containing a supporting salt in the capacitor element is, for example, produced in the following manner. First, an anode foil having a dielectric layer thereon and a cathode foil are wound with a separator interposed therebetween to form a capacitor element. Next, this capacitor element is impregnated with a polymerization solution containing a polymerizable monomer such as pyrrole, thiophene, and derivatives thereof, an oxidizing agent such as ammonium persulfate, and sodium persulfate, and a doping agent such as naphthalenesulfonic acid. Then, the above-mentioned polymerizable monomer is oxidatively polymerized in the inside of the capacitor element to form the electrically conductive solid layer.

An electrolytic capacitor has been required not to cause short circuit or ignition due to short circuit even if an overvoltage exceeding the rated voltage is applied. For this purpose, a structure for preventing emission of a gas generated inside an electrolytic capacitor by sealing an outer casing with a sealing body is employed for conventional electrolytic capacitors. However, if the short circuit of a capacitor element itself is prevented at a time of overvoltage application, higher safety can be assured.

SUMMARY OF THE INVENTION

In order to solve the above-mentioned problem, an object of the invention is to provide an electrolytic capacitor hardly causing short circuit and excellent in safety even if an overvoltage is applied.

According to one aspect of the present invention, there is provided a method for manufacturing an electrolytic capacitor comprising:

forming a capacitor element having an anode foil and a cathode foil;

impregnating the capacitor element with a dispersion solution containing particles of an electrically conductive solid or aggregates thereof and a dispersion solvent to form an electrically conductive solid layer having the particles of the electrically conductive solid or the aggregates thereof in the capacitor element; and impregnating the capacitor element having the electrically conductive solid layer with a solvent containing no supporting salt.

According to another aspect of the present invention, there is provided an electrolytic capacitor comprising:

a capacitor element having an anode foil and a cathode foil; and an electrically conductive solid layer containing particles of an electrically conductive solid or agglomerates thereof and a solvent containing no supporting salt in the capacitor element, wherein the electrically conductive solid layer is formed by impregnating the capacitor element with a dispersion solution containing the particles of the electrically conductive solid or agglomerates thereof and a dispersion solvent.

According to the present invention, an electrolytic capacitor hardly causing short circuit and excellent in safety can be produced even if an overvoltage is applied.

Other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

Figure 1:
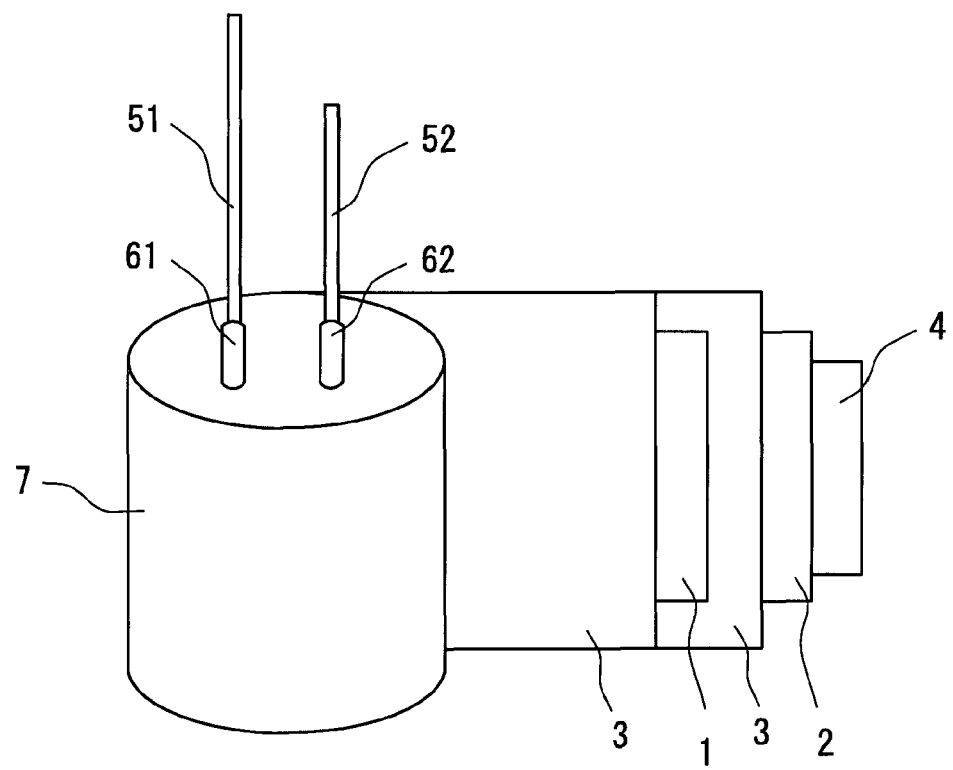
FIG. 1 is a schematic diagram showing one example of a capacitor element according to an embodiment of the present invention.

FIG. 1 is a schematic diagram showing one example of a capacitor element according to an embodiment of the present invention. A wound capacitor element 7 is formed by winding an anode foil 1 as described below and an opposite cathode foil 2 with a separator 3 therebetween. This anode foil 1 is a foil which is made of such a valve metal as aluminum, tantalum, niobium or titanium and which undergoes an etching process for roughing the surface and a chemical conversion process for forming the dielectric layer. The foils 1,2 are wound and thereafter fixed by a winding end tape 4. To the anode foil 1 and the opposite cathode foil 2 respectively, leads 51, 52 are attached through lead tabs 61, 62.

In the case of manufacturing the electrolytic capacitor of the present embodiment, the above-mentioned wound capacitor element is impregnated with a dispersion solution containing particles of an electrically conductive solid or aggregates thereof (hereinafter, referred to as "particles or the like") and a dispersion solvent to form a thin planar electrically conductive solid layer containing the particles or the like in the capacitor element, and then the capacitor element in which the electrically conductive solid layer is formed is impregnated with a solvent containing no supporting salt.

Figure 5:
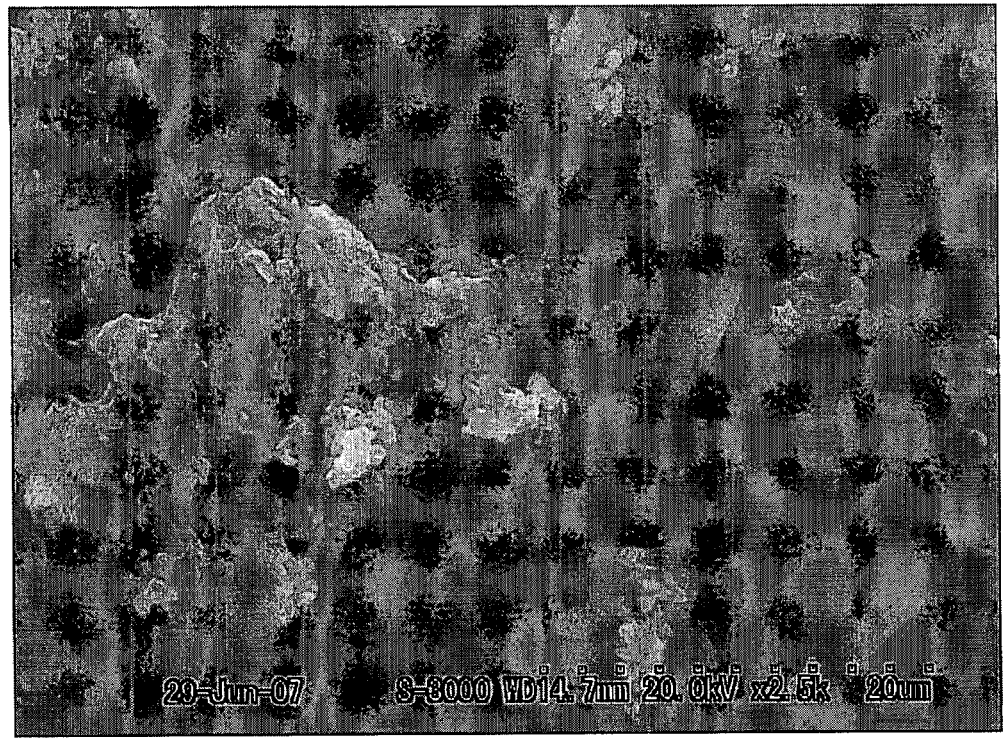
FIG. 5 is a scanning electron microscope photograph showing the surface state of an anode foil, on which an electrically conductive solid layer according to a conventional method.

As described above, an electrically conductive solid layer containing an electrically conductive polymer or the like is excellent in the electric conductivity as compared with an electrolytic solution containing a supporting salt. However, with respect to a conventional electrolytic capacitor in which an electrically conductive solid layer is formed in a capacitor element by impregnating the capacitor element with a polymerization solution containing a polymerizable monomer, an oxidizing agent, and a dopant agent, damaged portions on a dielectric layer tend to be formed due to the oxidizing agent and polymerization reaction, and the electrically conductive solid layer tends to be formed unevenly on the surfaces of the electrode foils and the separator. FIG. 5 is a photograph taken by a scanning electron microscope, of the surface of an anode foil on which the electrically conductive solid layer is formed by carrying out the oxidative polymerization once in the capacitor element in accordance with a conventional method. Meanwhile, in this measurement, since an electrically conductive solid layer formed in the part where an anode foil and a separator were brought into contact with each other is easy to be peeled, the measurement should be carried out in the free surface of the anode foil where the contact of the anode foil and the separator is little (a part of the anode foil surface having no direct contact with the separator). As shown in the drawing, it can be found that the electrically conductive solid layer is formed as a sponge-like uneven film on the anode foil. Since an electrically conductive solid layer with a constant thickness has to be formed on the entire surface of the anode foil in order to reduce the ESR, in the case where a practical production process of forming the above-mentioned electrically conductive solid layer with such unevenness, the oxidative polymerization has to be repeated. As a result, the damaged portions are further increased and partial thickening of the electrically conductive solid layer proceeds. It is supposed that due to occurrence of damaged portions by the oxidative polymerization and uneven coating with a thick electrically conductive solid layer, short circuit tends to occur at a time of overvoltage application.

Figure 4:
FIG. 4 is a scanning electron microscope photograph showing the surface state of an anode foil, on which an electrically conductive solid layer according to the embodiment of the present invention is formed.

On the other hand, with respect to the electrically conductive solid layer formed by the manufacturing method according to the embodiment of the present invention, since the capacitor element is impregnated with a dispersion solution containing particles or the like of a previously formed electrically conductive solid, no damaged portion of the dielectric layer is formed by the oxidizing agent or polymerization reaction and the planar electrically conductive solid layer is evenly formed. FIG. 4 is a photograph taken by a scanning electron microscope same as FIG. 5, of the surface of an anode foil on which the electrically conductive solid layer is formed by the manufacturing method according to the embodiment of the present invention. As shown in the drawing, it is found that the electrically conductive solid layer is evenly formed on the entire surface of the anode foil and that the layer is a planar film. Accordingly, even in the case that a thin electrically conductive solid layer is formed, not only the electric conductivity is sufficiently attained but also the protection action for the dielectric layer is excellent. Therefore, it is made possible to obtain an electrolytic capacitor with low ESR, low leak current and high heat resistance even if it contains only a solvent but no supporting salt. Further, in this manufacturing method, since no damaged portion is formed in the dielectric layer by an oxidizing agent or polymerization reaction, occurrence of short circuit due to the damaged portion can be suppressed. Furthermore, since the electrically conductive solid layer is not formed by oxidative polymerization in the capacitor element, the washing and drying processes after the oxidative polymerization can be skipped, and thus the electrolytic capacitor can be produced relatively easily.

In the present embodiment, the amount of the particles or the like of the electrically conductive solid to be introduced into the capacitor element is preferably 5 to 55% by volume with respect to the void volume in the inside of the capacitor element to form the thin electrically conductive solid layer evenly on the entire surface of the electrode foils and the like. If the amount is 5% by volume or more, the electrically conductive solid layer can be densely formed on the entire surface of the electrode foils and the like with an even thickness, and thus sufficient electric conductivity can be attained. Further, if the amount is 55% by volume or less, the thickness of the electrically conductive solid layer can be suppressed and accordingly, the void volume in the inside of the capacitor element for immersing the solvent containing no supporting salt can be surely kept. Therefore, the leak current can be further improved.

In the present embodiment, the thickness of the electrically conductive solid layer is preferably 10 μm or less, more preferably 2 to 10 μm. If the thickness of the electrically conductive solid layer is 10 μm or less, the cracking of the electrically conductive solid layer can be suppressed and deterioration in the leak current at the time of mounting and long time use can be further suppressed. The amount of the particles or the like of the electrically conductive solid and the thickness of the electrically conductive solid layer can be adjusted in accordance with the concentration of the dispersion solution and the number of times of impregnation.

In the present embodiment, the electrically conductive solid is for example manganese dioxide, 7,7,8,8-tetracyanoquinodimethane (TCNQ), electrically conductive polymer or the like. Among them, the electrically conductive polymer is preferably used. As the electrically conductive polymer, polypyrrole, polythiophene and respective derivatives thereof for example are preferably used because of their high electrical conductivity, and polythiophene and a derivative thereof are more preferably used. These polymers may be used alone or as a mixture. Among them, polyethylenedioxythiophene is preferable used since it has a considerably high electrical conductivity. A method for forming the particles or the like of the electrically conductive solid containing the electrically conductive polymer is not particularly limited, and examples thereof can include a vapor phase polymerization method, an electrolytic oxidative polymerization method, a chemical oxidative polymerization method, and the like. The electrically conductive solid may be particles and aggregates formed by aggregating the particles. In particular, in the case of particles of an electrically conductive polymer, some particles are aggregated and form aggregates at the time of production or preparation of a dispersion solution.

In the present invention, preferably the dispersion solvent in which the electrically conductive solid is dispersed is a solvent in which the solubility of the electrically conductive solid is low or the electrically conductive solid does not dissolve therein. By using such a poor solvent for the electrically conductive solid, the dispersion solution can be obtained in which most of, preferably almost all of the electrically conductive solid does not dissolve. In the cases where the electrically conductive solid contains an electrically conductive polymer such as polypyrrole and polythiophene, these electrically conductive polymers do not dissolve in most of solvents and thus the dispersion solvent for forming the dispersion solution can be selected from various types of organic and inorganic solvents. In terms of ease of handling and dispersion property of the electrically conductive solid, the dispersion solvent for forming the dispersion solution is preferably water or a mixed solvent of water as a main solvent and another solvent.

The concentration of the particles or the like of the electrically conductive solid in the dispersion solution is not limited to a particular one, and is preferably 1 to 30% by weight. If the concentration of the electrically conductive solid is 1% by weight or high, it is possible to introduce sufficient amount of the electrically conductive solid into the capacitor element fewer times whereby productivity can be raised. If the concentration is 30% by weight or less, the thin electrically conductive solid layer can be formed evenly on the surface of the electrode foils and the like. In order to more evenly form the electrically conductive solid layer, it is particularly preferable that the concentration of the particles or the like of the electrically conductive solid in the dispersion solution is 3 to 20% by weight. In the case where the electrically conductive solid contains an electrically conductive polymer, the method of preparing the dispersion solution may be for example (1) a method according to which the electrically conductive polymer is dispersed in the dispersion solvent, (2) a method according to which a monomer is polymerized in the dispersion solvent to produce the electrically conductive polymer. When the method (2) is used, it is preferable to remove unreacted monomer, impurities and the like after the polymerization reaction.

The method of impregnating the capacitor element with the dispersion solution containing the particles or the like of the electrically conductive solid is not limited to a particular one, and any known method is used. In particular, the method according to which the capacitor element is immersed in the dispersion solution is preferably used because of relatively easy operation. The time for immersion depends on the size of the capacitor element and may be a few seconds to a few hours, preferably 1 to 30 minutes. The temperature for immersion is not limited to a particular one, and may be 0 to 80° C., preferably 10 to 40° C. The impregnation may be performed under reduced pressure, for example, 30 to 100 kPa, preferably 80 to 100 kPa, for the purpose of accelerating the impregnation and shortening the time for impregnation. In order to further accelerate the impregnation, or to keep the dispersion state of the particles or the like in the dispersion solution uniform, ultrasonic treatment may be carried out while the capacitor element is immersed.

Subsequently, the capacitor element impregnating with the dispersion solution is preferably dried to evaporate the dispersion solvent adhered to the capacitor element. Drying can be processed with a conventionally known oven. The drying temperature may be for example 80 to 300° C. In the case where the dispersion solvent contains water, the temperature is preferably 100 to 200° C.

The impregnation and drying of the dispersion solution may be repeated a plurality of times so as to form an electrically conductive solid layer with an even thickness. Repeat of the impregnation and drying of the dispersion solution a plurality of times makes it possible to further densely coat the surfaces of the electrode foils and the like with the electrically conductive solid layer containing the particles or the like of the electrically conductive solid, and accordingly to surely suppress short circuit at a time of overvoltage application.

Next, the capacitor element in which an electrically conductive solid layer is formed is impregnated with a solvent containing no supporting salt. Consequently, the solvent can fill voids in the electrically conductive solid layer containing particles of an electrically conductive solid introduced into the capacitor element. Therefore, according to the embodiment of the present invention, since the thin electrically conductive solid layer is formed evenly on the surfaces of the electrode foils and the like, not only the protection function for the dielectric layer is excellent but also the thin electrically conductive solid layer can be covered with the impregnated solvent evenly. Although the reason is not clear at present as to why the short circuit can be suppressed at a time of overvoltage application by impregnating the capacitor element into which a previously formed electrically conductive solid layer is introduced with the solvent containing no supporting salt as compared with a case of impregnating the capacitor element with an electrolytic solution containing a supporting salt, it is supposed that the heat deterioration of the electrically conductive solid layer can be suppressed in a case of impregnation with the solvent containing no supporting salt as compared with a case of impregnation with an electrolytic solution containing a supporting salt. That is, as described above, in a case of a conventional electrolytic capacitor, the capacitor element is impregnated with an electrolytic solution containing a supporting salt in order to repair a damaged portion of a dielectric layer. However, it is supposed that a solvent containing no supporting salt has a higher heat capacity than such an electrolytic solution containing a supporting salt. Therefore, it is supposed that the temperature rise of the electrically conductive solid layer can be moderated at a time of overvoltage application in a case of impregnation with a solvent containing no supporting salt as compared with a case of impregnation with an electrolytic solution containing a supporting salt and consequently, the heat deterioration of the electrically conductive solid layer can be suppressed and occurrence of short circuit can be suppressed. Moreover, with respect to the electrolytic capacitor to be produced in the above-mentioned manner, since the thin electrically conductive solid layer is formed uniformly, initial properties and heat resistance to such an extent that there is no practical problem, can be assured even without a supporting salt.

As the solvent, any conventionally known solvent for an electrolytic capacitor can be employed. As a preferable solvent, γ-butyrolactone, sulfolane, ethylene carbonate, propylene carbonate, dimethyl carbonate, ethyl methyl carbonate, acetonitrile, propionitrile, dimethyl formamide, diethyl formamide, water, silicone oil, and a mixture thereof are exemplified. Among them, at least one selected from the group consisting of γ-butyrolactone and sulfolane is preferable to be used.

The method of impregnating the capacitor element having the electrically conductive solid layer formed therein with a solvent is not limited to a particular one, and any conventionally known method is employed. In particular, the method according to which the capacitor element is immersed in a solvent is preferably used because of relatively easy operation. The time for immersion depends on the size of the capacitor element and may be for example one second to a few hours, preferably one to five minutes. The temperature for immersion is not limited to a particular one, and may be for example 0 to 80° C., preferably 10 to 40° C. The impregnation of the solvent is preferably performed under reduced pressure for the purpose of accelerating the impregnation.

Figure 2:
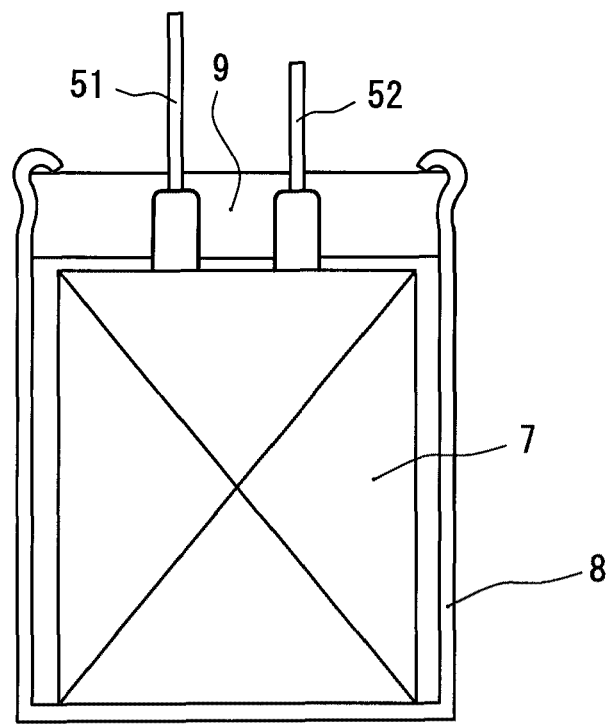
FIG. 2 is a cross-sectional view showing one example of an electrolytic capacitor according to the embodiment of the present invention.

After the above-described steps, as shown in FIG. 2, a capacitor element 7 including the electrically conductive solid layer and the solvent containing no supporting salt therein is held in an aluminum casing 8 in the shape of a bottomed cylinder. Next, a rubber packing 9 is attached in the opening of the aluminum casing 8 and drawing and curling processes are performed on the casing. After this, while a rated voltage is applied, an aging process is performed for example at a temperature of approximately 125° C. for approximately one hour, and accordingly the electrolytic capacitor is completed.

Although examples using a wound capacitor element in which an anode foil and a cathode foil are wound with a separator interposed therebetween are explained, the invention may be applied to laminated capacitor element in which a plurality of cathode foils and anode foils are laminated.

In the following, examples and comparative examples are used to describe the present invention in more detail. The present invention, however, is not limited to them.

EXAMPLES

Example 1

An anode foil having a dielectric layer thereon and an opposite cathode foil were wound with a separator interposed therebetween, whereby a capacitor element which had a dimension in the completed state (the outer dimension of the electrolytic capacitor in the state where the capacitor element is housed in an aluminum casing) of diameter 10 mm×height 10.5 mm, and which had a rated voltage of 4 V and a nominal capacitance of 1200 μF, was produced. Next, the capacitor element produced in the above-mentioned manner was impregnated with a dispersion solution prepared by dispersing polyethylenedioxythiophene particles containing a dopant agent in water (concentration of polyethylenedioxythiophene: 10% by weight), at 25° C. for 1 minute under reduced pressure of 89 kPa. After the impregnation, the capacitor element was taken out of the dispersion solution, put in a drying oven at 125° C. and dried to form an electrically conductive solid layer. Next, the capacitor element in which the electrically conductive solid layer was formed was immersed in γ-butyrolactone at 25° C. for 10 seconds under reduced pressure.

Then, the capacitor element having the electrically conductive solid layer and the solvent was housed in an aluminum casing. Successively, a rubber packing was attached to an opening of the aluminum casing and the aluminum casing was processed by drawing and curling. Thereafter, while the voltage 1.15 times as high as the rated voltage was applied, aging was carried out at about 125° C. for about 1 hour to produce an electrolytic capacitor.

Example 2

An electrolytic capacitor was produced in the same manner as in Example 1, except that sulfolane was used instead of γ-butyrolactone.

Comparative Example 1

An electrolytic capacitor was produced in the same manner as in Example 1, except that an electrolytic solution containing γ-butyrolactone and borodisalicylic acid trimethylamine as a supporting salt (concentration of borodisalicylic acid trimethylamine: 12% by weight) was used instead of γ-butyrolactone.

Comparative Example 2

An electrolytic capacitor was produced in the same manner as in Example 1, except that an electrolytic solution containing γ-butyrolactone and borodisalicylic acid trimethylamine as a supporting salt (concentration of borodisalicylic acid trimethylamine: 15% by weight) was used instead of γ-butyrolactone.

The respective electrolytic capacitors of Examples 1 and 2 and Comparative Examples 1 and 2 produced in the above-manner were subjected to an overvoltage test. The overvoltage test was carried out by applying a voltage to each electrolytic capacitor and measuring ESR (measurement frequency: 100 kHz) at a time of increasing the voltage to be applied. The results are shown in FIG. 3.

Figure 3:
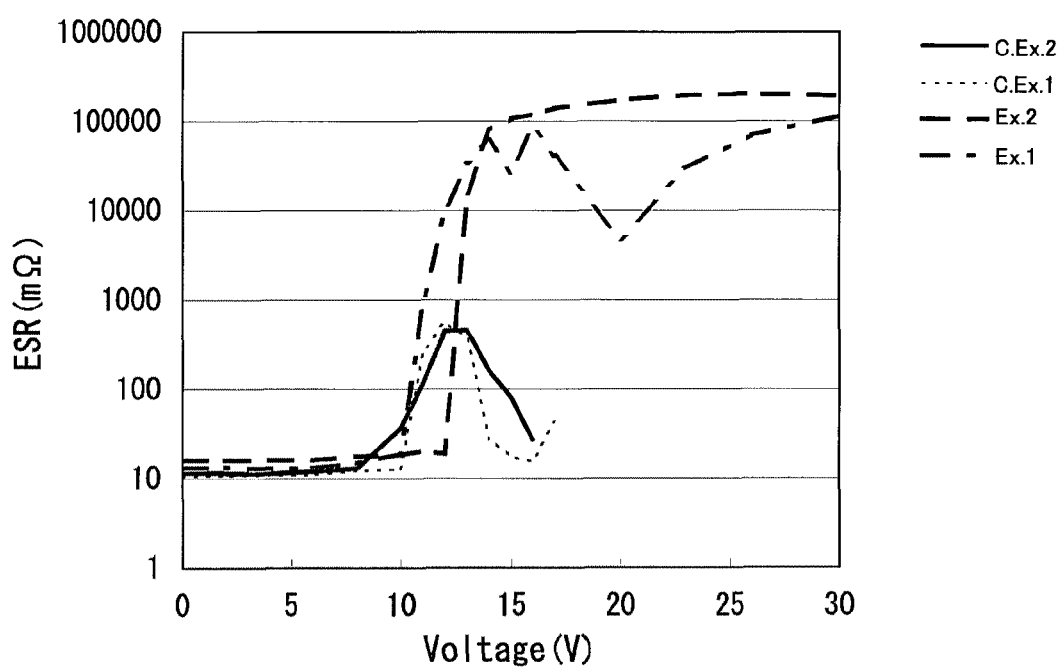
FIG. 3 is a graph showing overvoltage test results of electrolytic capacitors according to Examples and Comparative Examples.

As shown in FIG. 3, electrolytic capacitors of Examples, each of which contains an electrically conductive solid layer formed by impregnating a capacitor element with a dispersion solution containing particles or the like of an electrically conductive solid in a dispersion solvent and a solvent containing no supporting salt, showed an increase in ESR as the applied voltage was increased in the overvoltage test; however, these electrolytic capacitors did not cause short circuit. It is supposedly because, as compared with an electrolytic capacitor having an electrically conductive solid layer formed in a capacitor element, the electrolytic capacitors of Examples did not cause damages in the dielectric layer due to an oxidizing agent or polymerization reaction and the heat deterioration of the electrically conductive solid layers was suppressed at a time of overvoltage application by the impregnating the solvent containing no supporting salt into the capacitor element.

On the other hand, although the electrolytic capacitors of Comparative Examples 1 and 2 were each an electrolytic capacitor having an electrically conductive solid layer formed by impregnating a dispersion solution containing particles of an electrically conductive solid dispersed in a dispersion solvent similarly to electrolytic capacitors of Examples, the electrolytic capacitors of Comparative Examples 1 and 2 each using an electrolytic solution containing a supporting salt caused short circuit at about 17 V. It is supposed because the heat deterioration of the electrically conductive solid layer cannot be suppressed sufficiently at a time of overvoltage application in a case where a capacitor element is impregnated with an electrolytic solution containing a supporting salt.

Next, to compare the difference in capacitor properties due to existence of a supporting salt, electrolytic capacitors with a completed size of diameter 10 mm×H 10.5 mm and having a rated voltage of 63 V and a nominal capacitance of 33 µF were produced (Examples 3 and 4 and Comparative Example 3) similarly to the electrolytic capacitors of Examples 1 and 2 and Comparative Example 1. The respective electrolytic capacitors of Examples 3 and 4 and Comparative Example 3 produced in the above-mentioned manner were subjected to the measurements of capacitance (measurement frequency: 120 Hz), ESR (measurement frequency: 100 kHz), and leak current. Further, a solder heat resistance test (peak temperature: 265° C., time exposed to 200° C. or more: 70 seconds) was carried out for the respective electrolytic capacitors of Examples 3 and 4 and Comparative Example 3 and after the test, the capacitance, ESR, and leak current were measured under the same conditions as described above. The results are shown Table 1.

the like of electrically conductive solids into capacitor elements and the heat resistance was improved by impregnation of the capacitor elements with solvents containing no supporting salt.

As described above in detail, according to one aspect of the present invention, there is provided a method for manufacturing an electrolytic capacitor comprising:

forming a capacitor element having an anode foil and a cathode foil;

impregnating the capacitor element with a dispersion solution containing particles or the like of an electrically conductive solid and a dispersion solvent to form an electrically conductive solid layer having the particles of the electrically conductive solid or the aggregates thereof in the capacitor element; and impregnating the capacitor element having the electrically conductive solid layer with a solvent containing no supporting salt.

According to the above method, since the capacitor element is impregnated with the dispersion solution containing particles or the like of a previously formed electrically conductive solid, the electrically conductive solid layer is evenly formed in the capacitor element, whereby the high electric conductivity can be obtained. Also, since the electrically conductive solid layer is not produced in the capacitor element, no damaged portion of the dielectric layer is formed by the oxidizing agent or polymerization reaction. Further, since the electrically conductive solid layer is evenly formed on the entire surface of the dielectric layer, the protection function for the dielectric layer is excellent, whereby even if damaged portions are formed in the dielectric layer by heat, the damaged degree can be suppressed. Therefore, short circuit due to the damaged portion can be suppressed. Furthermore, the solvent containing no supporting salt is impregnated into the capacitor element after forming the electrically conductive solid layer, and the solvent containing no supporting salt can

TABLE 1

| | | | Initial stage | | | After Solder heat resistance test | | |
|---|---|---|---|---|---|---|---|---|
| | Solvent | Supporting salt | Capacitance (µF) | ESR (mΩ) | Leak current (µA) | Capacitance (µF) | ESR (mΩ) | Leak current (µA) |
| Ex. 3 | GBL | None | 34.5 | 21.0 | 2.1 | 34.1 | 28.4 | 16.6 |
| Ex. 4 | Sulfolane | None | 33.7 | 27.7 | 1.4 | 33.7 | 32.8 | 13.3 |
| C. Ex. 3 | GBL | Contained | 35.3 | 14.4 | 2.1 | 34.9 | 17.0 | 14.2 |

GBL: γ-butyrolactone

As shown in Table 1, although the electrolytic capacitors of Examples were each impregnated with a solvent containing no supporting salt, it can be understood that the capacitance and leak current as initial properties were almost same as those of an electrolytic capacitor impregnated with an electrolytic solution containing a supporting salt. Further, it can also be understood that the electrolytic capacitors of Examples had slightly high ESR as compared with that of the electrolytic capacitor of Comparative Example; however, these electrolytic capacitors have the ESR to such an extent that there is no practical problem. Furthermore, it can be understood that the alteration degrees of the respective properties of the electrolytic capacitors of Examples and the electrolytic capacitor of Comparative Example were approximately same even after a solder heat resistance test. It is supposedly attributed to that, in the electrolytic capacitors of Examples, the electrically conductive solid layers excellent in electric conductivity were formed by introducing particles or suppress the heat deterioration at a time of overvoltage application, as compared with an electrolytic solution containing a supporting salt. As a result, short circuit can be further suppressed even if an overvoltage is applied, whereby an electrolytic capacitor excellent in safety can be obtained.

According to another aspect of the present invention, there is provided an electrolytic capacitor comprising:

a capacitor element having an anode foil and a cathode foil; and an electrically conductive solid layer containing particles or the like of an electrically conductive solid and a solvent containing no supporting salt in the capacitor element, wherein the electrically conductive solid layer is formed by impregnating the capacitor element with a dispersion solution containing the particles or the like of the electrically conductive solid and a dispersion solvent.

According to the above electrolytic capacitor, since the electrically conductive solid layer is formed by impregnating the capacitor element with the dispersion solution containing the particles or the like of a previously formed electrically conductive solid, no damaged portion of the dielectric layer is formed by the oxidizing agent or polymerization reaction and the electrically conductive solid layer is evenly formed in the capacitor element. Also, since the solvent containing no supporting salt is impregnated into the capacitor element formed with the electrically conductive solid layer, the heat deterioration of the electrically conductive solid layer at a time of overvoltage application can be suppressed.

The present application claims a priority based on Japanese Patent Application No. 2007-282195 filed on Oct. 30, 2007, the contents of which are hereby incorporated by reference in its entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:

1. A method for manufacturing an electrolytic capacitor comprising:
    forming a capacitor element having an anode foil and a cathode foil;
    impregnating the capacitor element with a dispersion solution containing particles of an electrically conductive polymer or aggregates thereof and a dispersion solvent to form an electrically conductive polymer layer having the particles of the electrically conductive polymer or the aggregates thereof in the capacitor element,
    wherein the dispersion solution does not contain an unreacted monomer and an oxidizing agent; and
    impregnating the capacitor element having the electrically conductive polymer layer with a solvent containing no supporting salt or acid acting as an electrolyte, wherein
    the solvent contains at least one selected from the group consisting of γ-butyrolactone, sulfolane, ethylene carbonate, propylene carbonate, dimethyl carbonate, ethyl methyl carbonate, acetonitrile, propionitrile, dimethyl formamide, and diethyl formamide.

2. The method for manufacturing an electrolytic capacitor according to claim 1, wherein the electrically conductive polymer contains at least one selected from the group consisting of polythiophene and a derivative thereof.

3. The method for manufacturing an electrolytic capacitor according to claim 1, wherein the solvent contains at least one selected from the group consisting of y-butyrolactone and sulfolane.

4. An electrolytic capacitor comprising:
    a capacitor element having an anode foil and a cathode foil; and
    an electrically conductive polymer layer containing particles of an electrically conductive polymer or agglomerates thereof and a solvent containing no supporting salt or acid acting as an electrolyte in the capacitor element,
    wherein the electrically conductive polymer layer is formed by impregnating the capacitor element with a dispersion solution containing the particles of the electrically conductive polymer or agglomerates thereof and a dispersion solvent,
    wherein the dispersion solution does not contain an unreacted monomer and an oxidizing agent,
    wherein the solvent contains at least one selected from the group consisting of γ-butyrolactone, sulfolane, ethylene carbonate, propylene carbonate, dimethyl carbonate, ethyl methyl carbonate, acetonitrile, propionitrile, dimethyl formamide, and diethyl formamide.

5. The electrolytic capacitor according to claim 4, wherein the electrically conductive polymer contains at least one selected from the group consisting of polythiophene and a derivative thereof.

6. The electrolytic capacitor according to claim 4, wherein the solvent contains at least one selected from the group consisting of γ-butyrolactone and sulfolane.

7. A method for manufacturing an electrolytic capacitor comprising:
    forming a capacitor element having an anode foil and a cathode foil;
    impregnating the capacitor element with a dispersion solution containing particles of an electrically conductive polymer or aggregates thereof and a dispersion solvent to form an electrically conductive polymer layer having the particles of the electrically conductive polymer or the aggregates thereof in the capacitor element,
    wherein the dispersion solution does not contain an unreacted monomer and an oxidizing agent; and
    impregnating the capacitor element having the electrically conductive polymer layer with a solvent not acting as an electrolytic solution, wherein
    the solvent contains at least one selected from the group consisting of γ-butyrolactone, sulfolane, ethylene carbonate, propylene carbonate, dimethyl carbonate, ethyl methyl carbonate, acetonitrile, propionitrile, dimethyl formamide, and diethyl formamide.

8. The method for manufacturing an electrolytic capacitor according to claim 7, wherein the electrically conductive polymer contains at least one selected from the group consisting of polythiophene and a derivative thereof.

9. The method for manufacturing an electrolytic capacitor according to claim 7, wherein the solvent contains at least one selected from the group consisting of γ-butyrolactone and sulfolane.

10. An electrolytic capacitor comprising:
    a capacitor element having an anode foil and a cathode foil; and
    an electrically conductive polymer layer containing particles of an electrically conductive polymer or agglomerates thereof and a solvent not acting as an electrolytic solution in the capacitor element,
    wherein the electrically conductive polymer layer is formed by impregnating the capacitor element with a dispersion solution containing the particles of the electrically conductive polymer or agglomerates thereof and a dispersion solvent or acid acting as an electrolyte,
    wherein the dispersion solution does not contain an unreacted monomer and an oxidizing agent, wherein the solvent contains at least one selected from the group consisting of γ-butyrolactone, sulfolane, ethylene carbonate, propylene carbonate, dimethyl carbonate, ethyl methyl carbonate, acetonitrile, propionitrile, dimethyl formamide, and diethyl formamide.

11. The electrolytic capacitor according to claim 10, wherein the electrically conductive polymer contains at least one selected from the group consisting of polythiophene and a derivative thereof.

12. The electrolytic capacitor according to claim 10, wherein the solvent contains at least one selected from the group consisting of γ-butyrolactone and sulfolane.

13. A method for manufacturing an electrolytic capacitor comprising:
    forming a capacitor element having an anode foil and a cathode foil;

impregnating the capacitor element with a dispersion solution containing particles of an electrically conductive polymer or aggregates thereof and a dispersion solvent to form an electrically conductive polymer layer having the particles of the electrically conductive polymer or the aggregates thereof in the capacitor element, wherein the dispersion solution does not contain an unreacted monomer and an oxidizing agent; and impregnating the capacitor element having the electrically conductive polymer layer with a solvent containing no supporting salt or acid acting as an electrolyte.

14. The method for manufacturing an electrolytic capacitor according to claim 13, wherein the electrically conductive polymer contains at least one selected from the group consisting of polythiophene and a derivative thereof.

15. An electrolytic capacitor comprising:
a capacitor element having an anode foil and a cathode foil; and
an electrically conductive polymer layer containing particles of an electrically conductive polymer or agglomerates thereof and a solvent containing no supporting salt or acting as an electrolyte in the capacitor element,
wherein the electrically conductive polymer layer is formed by impregnating the capacitor element with a dispersion solution containing the particles of the electrically conductive polymer or agglomerates thereof and a dispersion solvent,
wherein the dispersion solution does not contain an unreacted monomer and an oxidizing agent.

16. The method for manufacturing an electrolytic capacitor according to claim 15, wherein the electrically conductive polymer contains at least one selected from the group consisting of polythiophene and a derivative thereof.

17. A method for manufacturing an electrolytic capacitor comprising:

forming a capacitor element having an anode foil and a cathode foil;

impregnating the capacitor element with a dispersion solution containing particles of an electrically conductive polymer or aggregates thereof and a dispersion solvent to form an electrically conductive polymer layer having the particles of the electrically conductive polymer or the aggregates thereof in the capacitor element, wherein the dispersion solution does not contain an unreacted monomer and an oxidizing agent; and impregnating the capacitor element having the electrically conductive polymer layer with a solvent not acting as an electrolytic solution.

18. The method for manufacturing an electrolytic capacitor according to claim 17, wherein the electrically conductive polymer contains at least one selected from the group consisting of polytheiophene and a derivative thereof.

19. An electrolytic capacitor comprising:
a capacitor element having an anode foil and a cathode foil; and
an electrically conductive polymer layer containing particles of an electrically conductive polymer or agglomerates thereof and a solvent not acting as an electrolytic solution in the capacitor element,
wherein the electrically conductive polymer is formed by impregnating the capacitor element with a dispersion solution containing the particles of the electrically conductive polymer or agglomerates thereof and a dispersion solvent,
wherein the dispersion solution does not contain an unreacted monomer and an oxidizing agent.

20. The method for manufacturing an electrolytic capacitor according to claim 19, wherein the electrically conductive polymer contains at least one selected from the group consisting of polythiophene and a derivative thereof.

* * * * *